INVENTOR
EUGENE T. FLEISCHHAUER
BY Harold T. Stowell
Harold L. Stowell
ATTORNEYS

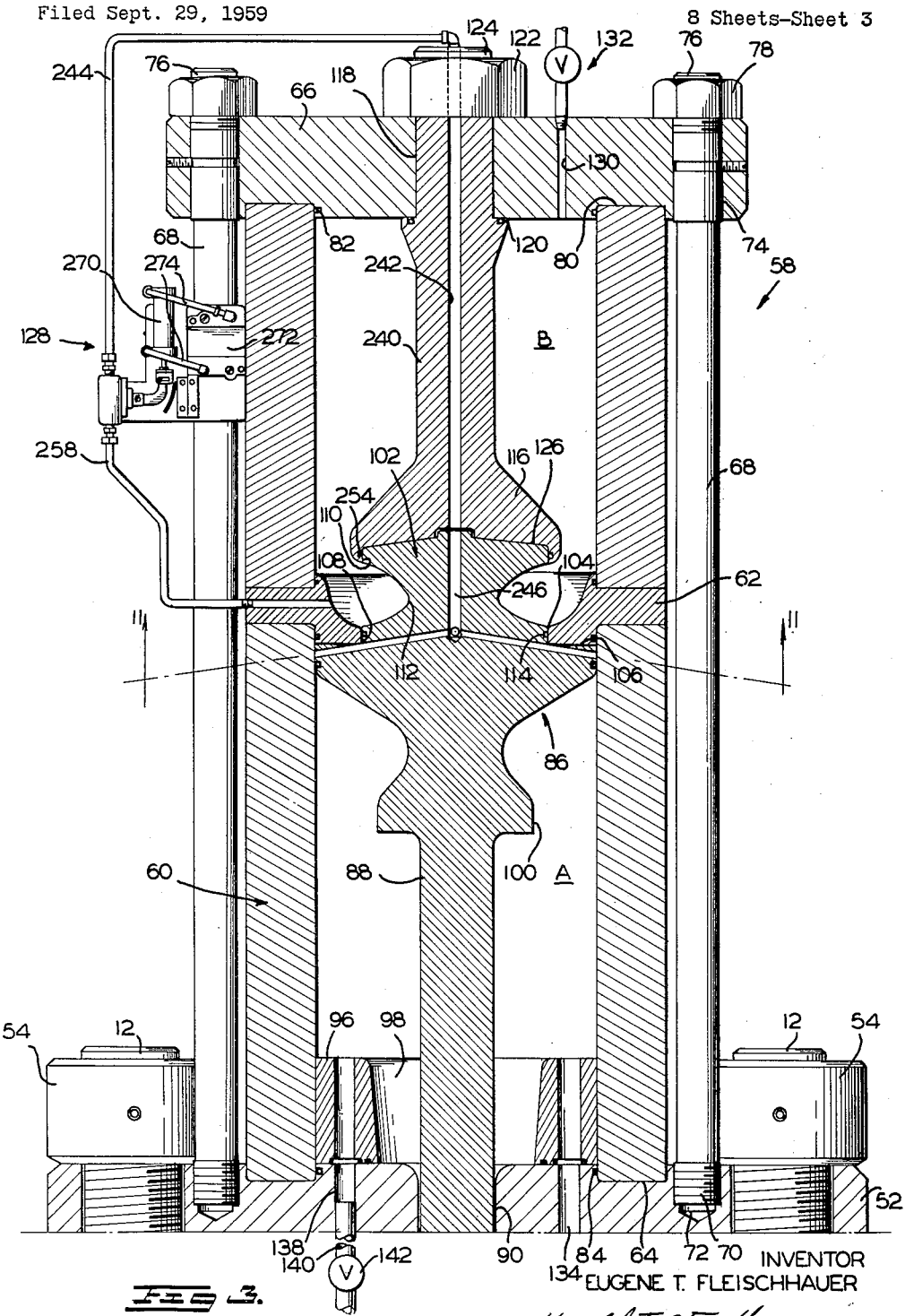

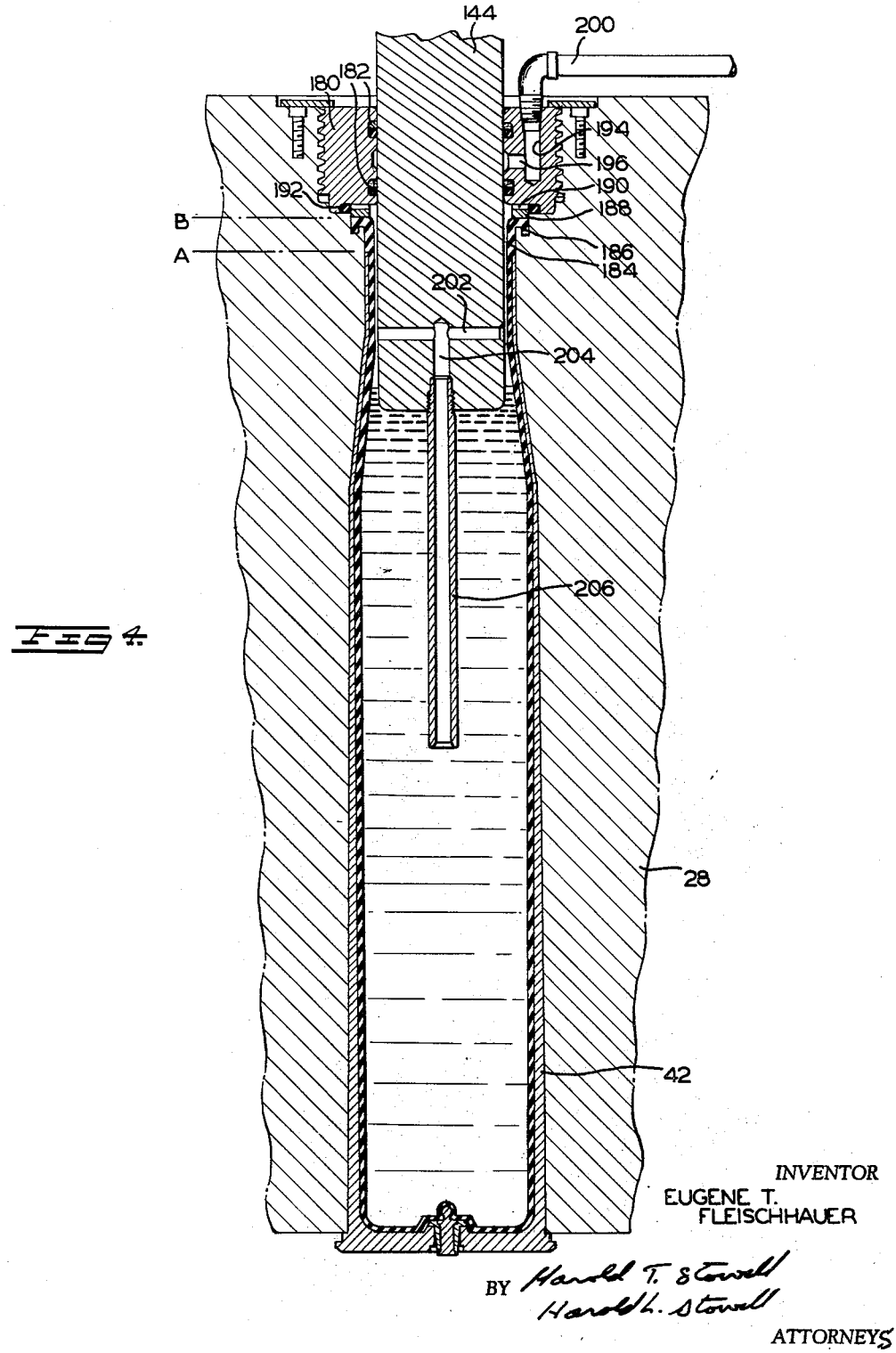

July 17, 1962  E. T. FLEISCHHAUER  3,044,289
PRESSURE FLUID RAM
Filed Sept. 29, 1959  8 Sheets-Sheet 5
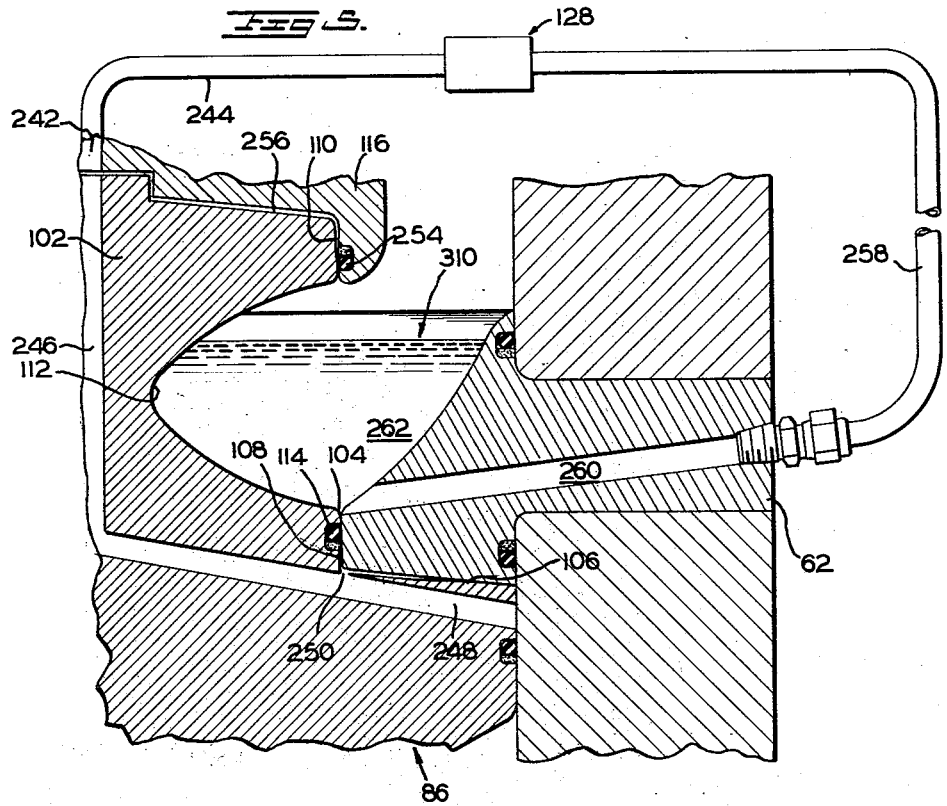
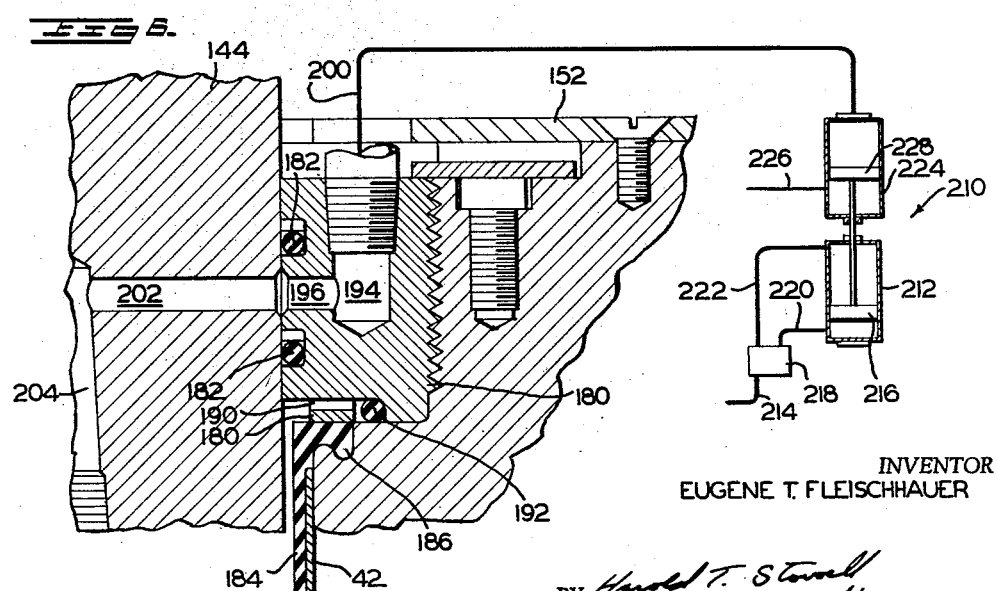
INVENTOR
EUGENE T. FLEISCHHAUER
BY Harold T. Stowell
Harold L. Stowell
ATTORNEYS

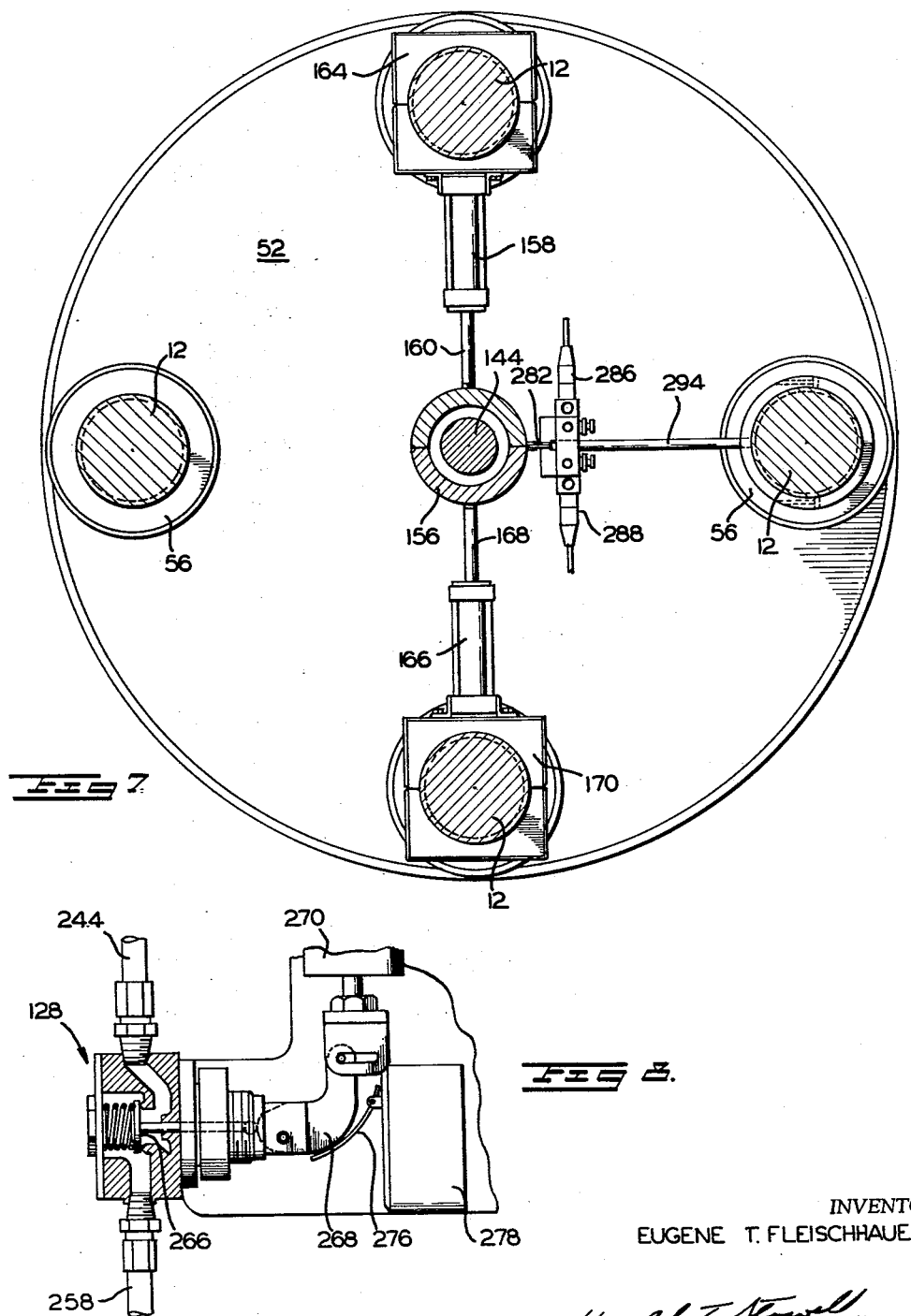

July 17, 1962 E. T. FLEISCHHAUER 3,044,289
PRESSURE FLUID RAM
Filed Sept. 29, 1959 8 Sheets-Sheet 7

INVENTOR
EUGENE T. FLEISCHHAUER

BY *Harold T. Stowell*
   *Harold L. Stowell*

ATTORNEYS

July 17, 1962   E. T. FLEISCHHAUER   3,044,289
PRESSURE FLUID RAM
Filed Sept. 29, 1959   8 Sheets-Sheet 8
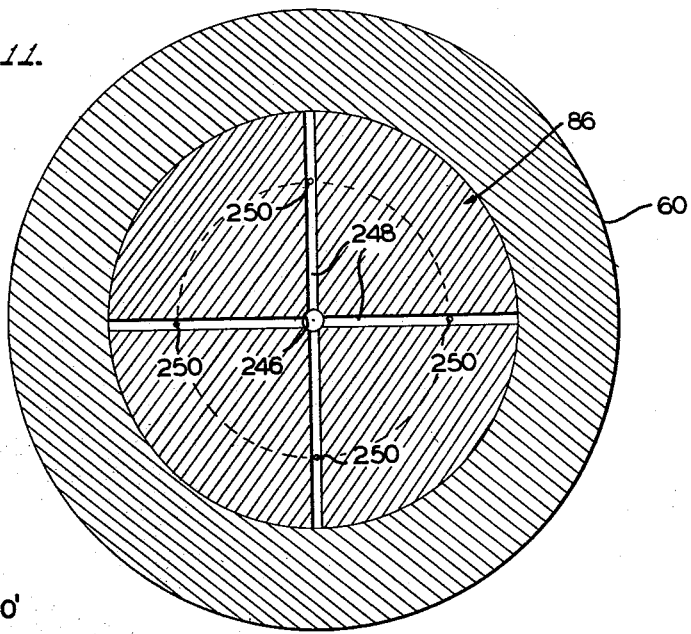
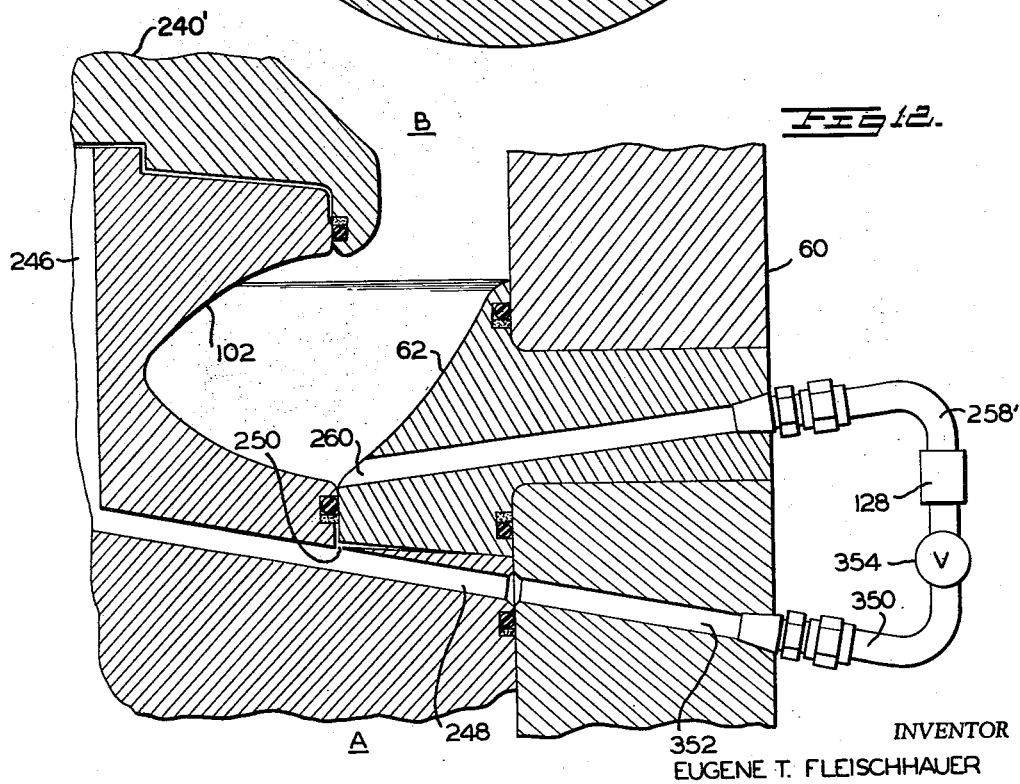
INVENTOR
EUGENE T. FLEISCHHAUER
BY Harold T. Stowell
   Harold L. Stowell
ATTORNEYS

United States Patent Office 3,044,289
Patented July 17, 1962

3,044,289
PRESSURE FLUID RAM
Eugene T. Fleischhauer, Richmond, Va., assignor to Texaco Experiment Incorporated, a corporation of Virginia
Filed Sept. 29, 1959, Ser. No. 843,175
10 Claims. (Cl. 73—12)

This invention relates to a new and improved pressure fluid ram mechanism having particular utility as an impact testing device.

It is a particular object of the invention to provide such a device capable of subjecting materials to predetermined pressure within a predetermined pressure-rise time.

Another object is to provide such a device wherein the operating energy is stored in a mass of elastic pressure fluid and selectively transferred to the material to be tested.

A further object is to provide such a device wherein a mass of elastic pressure fluid is employed to move a piston of a piston-cylinder device and wherein a balance of forces is maintained upon the piston until the time of operation of the device.

A further object is to provide a pressure fluid ram device wherein at the end of the stroke of the piston, the operating elastic fluid medium is recompressed to its original pressure by the reverse movement of the piston.

A further object is to provide a decelerator mechanism for the pressure fluid ram device to prevent piston damage in the event of structural failure of the material to be tested.

Another object is to provide in such a device reliable and accurate instrumentation.

Further objects are to provide a pressure fluid ram device that is relatively simple in construction and operation and rugged and quick-acting in use.

These and other objects and advantages of the present invention will be apparent to those skilled in the art from the following detailed description thereof when considered in view of the attached drawings illustrating an impact testing machine of the invention embodied in a steel cartridge case testing machine wherein:

FIG. 3 is an enlarged fragmentary sectional view of the upper portion of the impact testing machine illustrated in FIG. 1;

FIG. 4 is an enlarged fragmentary sectional view of the cartridge case holding means illustrated in FIG. 2 of the drawings;

FIG. 5 is an enlarged fragmentary sectional view of the piston and valve mechanism and the cylinder partition plate of the hydraulic ram incorporated in the structures of the invention;

FIG. 6 is an enlarged fragmentary detailed view of the means for directing a fluid into the cartridge cases to be tested;

FIG. 7 is a transverse sectional view substantially on line 7—7 of FIG. 9;

FIG. 8 is an enlarged fragmentary detailed view of the trigger valve mechanism;

FIG. 11 is a fragmentary transverse section substantially on line 11—11 of FIG. 3; and FIG. 12 is an enlarged fragmentary sectional view similar to FIG. 5 of a modified form of triggering mechanism for the impact testing device of the invention.

In general, the present invention comprises a pressure fluid ram device having a cylinder, heads at each end of the cylinder, a transverse partition having an opening therethrough concentric with the bore of the cylinder and dividing the cylinder into first and second chambers, a piston movable in the first chamber and having a piston rod extending therefrom through an opening in the cylinder head adjacent the first chamber, a valve spool carried by the piston and adapted to project through the opening in the partition, means in the second chamber seating the valve spool when the piston is in contact with the partition, means for moving the piston toward the partition to seat the valve spool in the valve seat against elastic pressure fluid in the second chamber and means for moving the piston away from the partition to unseat the valve spool from the valve seat whereby the pressure fluid in the second chamber passes through the opening in the partition and moves the piston through the first chamber.

Figure 1:
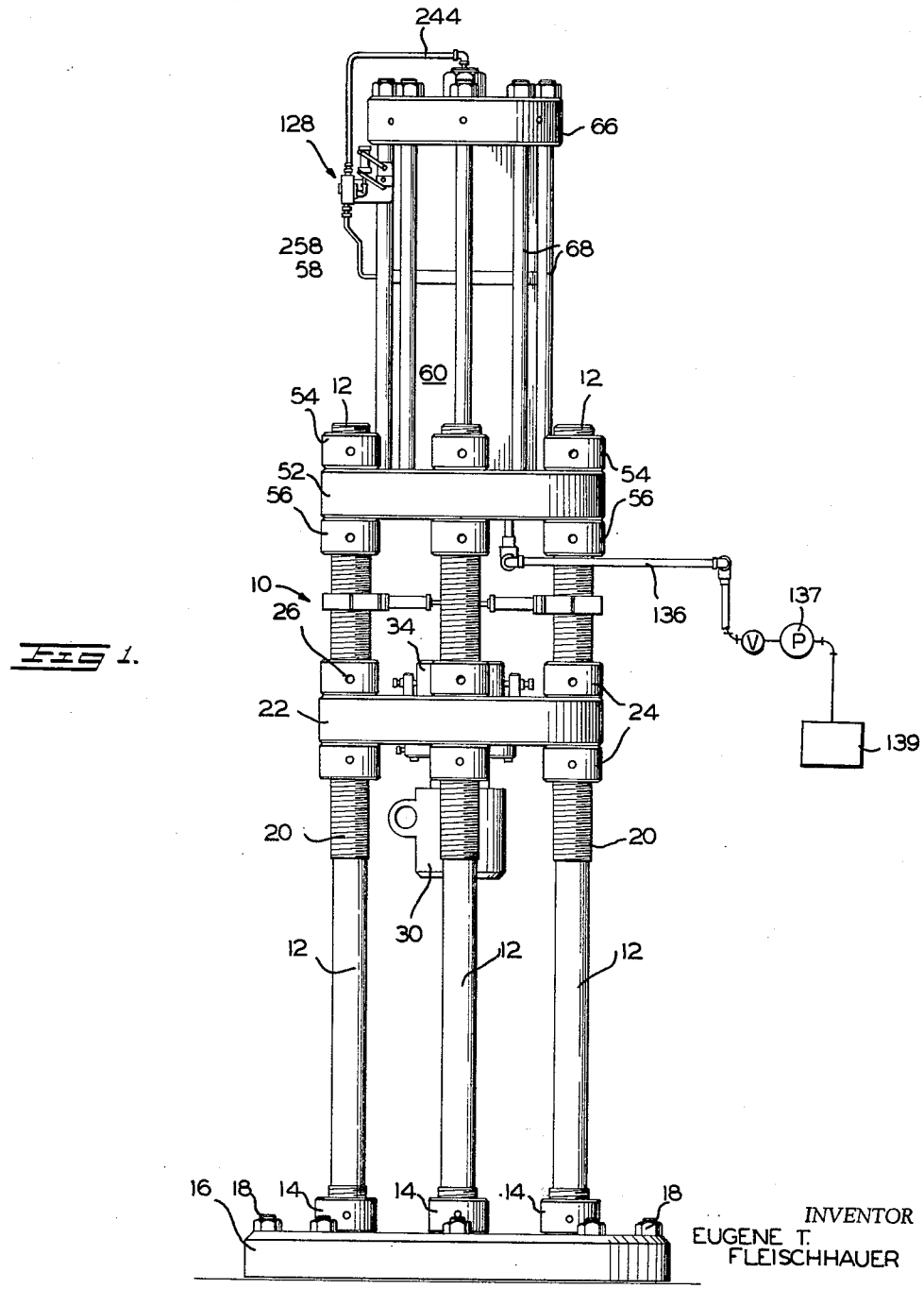
FIG. 1 is an elevational view of an impact testing machine incorporating the principles of the present invention.
Figure 2:
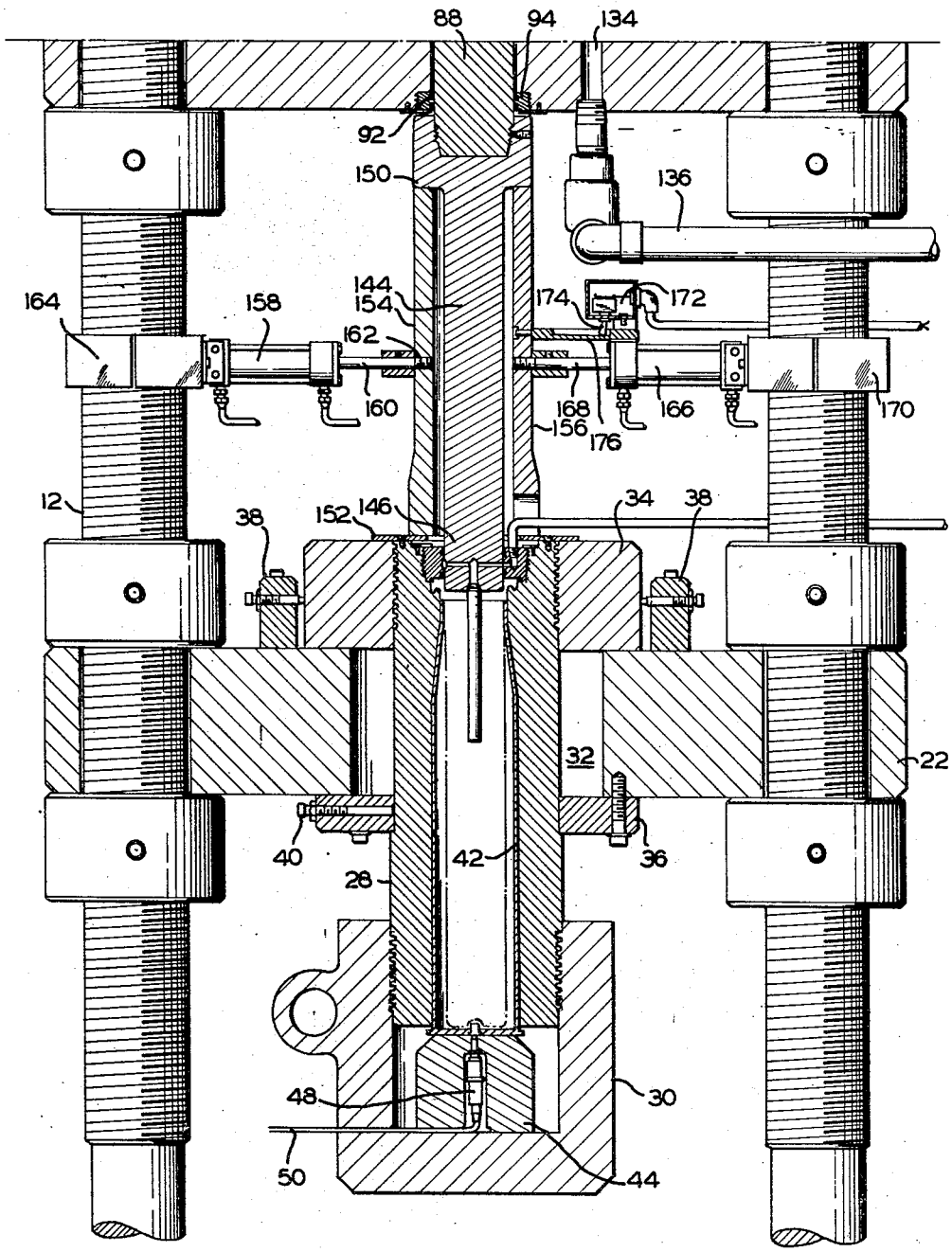
FIG. 2 is an enlarged fragmentary sectional view of the lower portion of the impact testing machine illustrated in FIG. 1.

The present invention is embodied in an impact testing mechanism adapted to pressurize steel cartridge cases, for example, a 90 millimeter cartridge case, by developing therein a pressure of about 75,000 p.s.i. in a pressure-rise time of a few milliseconds, for example, 0.005 to 0.007 second, or capable of developing a pressure of about 75,000 p.s.i. in a pressure-rise time of 0.005 to 0.007 second in a 120 millimeter cartridge case. Referring to the drawings and in particular FIGS. 1, 2 and 3, the cartridge case impact testing device is generally designated 10. The machine includes a plurality of main support columns 12, four being employed in the illustrated device. The lower end of each of the columns is anchored by nut means 14 in a base portion 16 mounted on a suitable pad by nut-and-bolt assemblies generally designated 18.

The upper portion of each of the columns 12 is provided with threads 20 and a mounting flange element 22 is bored to receive the columns 12. The mounting flange 22 is maintained in a predetermined spaced relationship to the base 16 by a plurality of nuts 24 which threadedly engage the threaded portions 20 of the columns 12. Each of the nuts 24 may be provided with conventional cap screws 26 for maintaining the nuts 24 in their predetermined positions. The flange 22 as more clearly illustrated in FIG. 2 rigidly supports a standard gun chamber 28 and a gun breech assembly 30. The gun chamber mounting flange 22 rigidly supports the gun chamber 28 and its breech assembly between an upper gun chamber adapter nut 34 and lower gun chamber adapter ring 36, which is bolted to the undersurface of the gun chamber mounting flange 22. The gun chamber adapter nut 34 is provided with, for example, three centering posts generally designated 38 of conventional design while the lower gun adapter ring is provided with a retaining and centering screw means generally designated 40.

Within the breech assembly and the gun chamber 28 and 30 is maintained a steel cartridge case 42 to be tested and at the lower end thereof is provided a block 44 which seats against the lower surface of the cartridge case 42 and internally receives a piezoelectric type transducer generally designated 48 having lead wires 50 passing through a bore in the breech assembly. The transducer is employed in measuring the pressure applied to the cartridge case 42.

Above the gun chamber mounting flange 22 is mounted a further flange or cylinder head base 52. The flange 52 is bored to receive the extended ends of the four columns 12 and the flange is maintained in fixed relationship to the lower gun chamber mounting flange 22 by upper and lower threaded nut assemblies 54 and 56. The flange 52 provides the cylinder head base for a piston-cylinder unit generally designated 58.

The piston-cylinder unit includes a cylinder 60 divided into two chambers A and B by a transverse partition member 62. The lower edge of cylinder 60 is maintained in a milled groove 64 provided in the upper surface of the cylinder head base 52. The cylinder 60 is also provided with a cylinder head 66 which cylinder head receives the upper edge of the cylinder 60 in a groove 80. The head 66 and the base head 52 are interconnected by a plurality of tie rods generally designated 68. Each of the tie rods has a threaded lower end 70 which engages cooperating threads in bores 72 in the cylinder head base 52, while the upper ends of cylinder tie rods 68 pass through bores 74 in the cylinder head 66 and the upper threaded extended ends 76 receive nut members 78.

Suitable O-rings 82 and 84 are provided in O-ring grooves in the cylinder head base and the cylinder head to insure a gas-tight pressure seal between the heads and the cylinder.

Within the cylinder chamber A is slidably mounted a piston generally designated 86 having a downwardly extending piston rod 88 which piston rod passes through a bore 90 in cylinder head base 52. A pressure seal between the piston rod 88 and the bore in cylinder head base 52 is insured by suitable packing and O-rings 92 carried by sealing element 94 threadedly received in the lower end of the bore 90 in cylinder head base 52 as more clearly illustrated in FIG. 2 of the drawings.

Mounted within the cylinder 60 adjacent the inner surface of the cylinder head base is a deceleration ring 96 having formed therein a deceleration orifice 98 which cooperates with a cylindrical boss 100 at the lower end of the piston element 86. The upper end of piston 86 forms a valve spool member 102 which valve spool member passes through a bore 104 in the partition member 62 when the piston 86 is in its most upward position with the head 106 of the piston in contact with the lower face of the partition member 62. The valve spool 102 is provided with two cylindrical surfaces 108 and 110 of the same diameter and a narrow portion 112 therebetween. The cylindrical portion 108 cooperating with the O-ring seal 114 forms a seal between chambers A and B at the opening 104 in the partition member 62 when the piston is in the position illustrated in FIG. 3.

The upper cylindrical surface 110 forms a seal with valve seat member 116 which is secured in an opening 118 in the cylinder head 66 by the cooperation of a flange 120 on the valve seat member and a thread-engaging nut 122 which engages an extended threaded shank portion 124 of the member 116. The lower end of the valve seat member 116 is recessed as at 126 to receive the head and the cylindrical surface 110 of the spool 102.

The reduced diameter portion 112, between the upper and lower cylindrical flanges 108 and 110, of the valve stem 102 provides for rapid passage of the elastic pressure fluid medium maintained in chamber B through the opening 104 in the partition member 62 to rapidly drive the piston 86 in the downward direction upon operation of the triggering valve structure generally designated 128 as to be more fully described hereinafter.

The assembly also includes a bore 130 in the cylinder head 66 which is connected by valved conduit 132 to a source of compressed gas so that the ram unit may be initially pressurized with an elastic pressure fluid such as nitrogen gas, air or the like.

Chamber A is provided with an inlet passage or bore 134 to which conduit means 136 is secured for directing a relatively non-elastic pressure fluid into and out of the chamber to move the piston 86 in an upward direction, also as to be more fully described hereinafter. Conduit means 136 is connected to a reversible hydraulic pump means 137, while the other end of pump means 137 is connected to a reservoir of hydraulic fluid generally designated 139. A further bore 138 having connected thereto a conduit 140 having valve means 142 therein is provided for directing an elastic pressure fluid medium into chamber A.

The lower end of piston rod 88 has removably secured thereto a ram member 144 which ram member has an extended lower end 146 adapted to be received within the gun chamber mounting member 28 and the cartridge case 42 to be tested.

Positioned between a flange 150 of the ram member 144 and a plate 152 secured to the upper surface of the gun adapter nut 34 are a pair of hemicylindrical ram lock members 154 and 156. The ram lock member 154 is moved into and out of the ram lock position by a pressure fluid actuated ram 158 having a piston rod 160, the extended end of which is secured as at 162 to the lock member 154. The pressure fluid actuated ram 158 is secured, by collar means 164, to one of the columns 12. The other hemicylindrical lock member 156 is actuated by ram 166 through piston rod 168. The ram 166 is attached to another of the columns 12 by bracket 170.

Attached to the ram 166 is a switch 172 having an actuator 174. The actuator is moved by a bar 176 secured to the ram lock member 156, whereby the switch actuator 174 is moved to the switch-on position and to the switch-off position upon movement of the ram lock 156 from the locked to the unlocked position. The switch may be employed to operate an indicator light not shown.

Referring particularly to FIGS. 2 and 4, about the upper end of the gun cartridge receiving chamber mechanism 28 is provided a member 180 which carries a plurality of seals 182 to insure a positive seal between the ram 144 and the cartridge chamber. The member 180 also provides means for maintaining, within the bore in the cartridge case chamber, a resilient bladder 184. The upper end of the bladder has a downwardly-turned flange 186 which engages a cooperating groove in the cartridge chamber member 28. A metal sealing ring 188 having openings 190 therein is positioned between the upper surface of the resilient bladder 184 and a lower surface of the sealing member 180. The openings 190 are adapted to equalize pressures on the O-ring seal 192 positioned between the sealing member 180 and the cartridge case receiving member 28.

The sealing member 180 is also provided with a bore 194 which bore communicates with a transverse bore 196. Conduit means 200 connects the bore 194 with means for transferring a relatively non-compressible fluid such as water into the bladder 184 when the piston and its connected ram 144 is positioned so that the transverse bore 196 in the sealing member 180 is aligned with transverse bore 202 in the ram 144. The transverse bore 202 communicates with vertical bore 204 in the lower end of the ram 144 and an extension tube 206 may be threadedly received at the lower end of the vertical bore 204 as more clearly illustrated in FIG. 4 of the drawings.

The conduit means 200 is connected to means generally designated 210, FIG. 6 of the drawings, for transferring a predetermined quantity of the generally incompressible fluid to the liner or bladder 184. The fluid transfer mechanism 210 comprises a conventional hydraulic ram 212 connected to a compressed gas actuating fluid through conduit 214. The direction of movement of the piston 216 of the ram 212 is determined by a conventional valve 218 which directs the compressed gas either through conduit 220 or 222. Movement of the piston 216 actuates a transfer ram 224. Transfer arm 224 has an inlet for the incompressible fluid conducted thereto through conduit 226 and an outlet which connects to piping 200. By directing a predetermined quantity of an incompressible liquid into the cylinder of the ram 224 when the piston 228 is in its lowermost position, the fluid is transferred to the inner resilient bladder 184 upon upward movement of the piston 228 through its coupled actuation with the ram 212.

The valve and trigger mechanism of the improved impact testing machine will be described with reference to FIGS. 3, 5, 8, and 11. The support 240 for the valve seat mechanism 116 is axially bored as at 242. The upper end of the bore 242 has communication with a pressure fluid conduit 244 positioned externally of the cylinder head 66. The lower end of the bore 242 communicates with a generally vertical bore 246 in the valve spool means 102 forming a part of the piston 86 of the ram mechanism. The vertical bore 246 of the spool 102 communicates with, for example, four generally transverse passages 248 positioned just below the surface of the head 106 of the piston 86. The generally transverse bores 246 communicate with the sealing line between the opening 104 in the partition plate 62 as indicated at 250, FIG. 5, whereby pressures are equalized on the O-ring seal 114 between the spool flange 108 and the side of the bore 104 of the partition member 62. It will also be noted, particularly in FIG. 5, that the O-ring sealing means 254 between the flange of the valve seat and the boss 110 of the valve spool 112 is provided with a pressure fluid bleed space 256. The trigger mechanism 128 is also connected by conduit means 258 with a generally transverse bore 260 in the partition plate 62. The innermost end of the bore 260 communicates with a well or sump 262 formed between the reduced portion 112 of the valve spool and the wall of the opening in partition 62.

With particular reference to FIG. 8, it will be noted that conduit 258 is in communication with conduit 244 through the trigger valve 128 when the normally closed valve plunger 266 is urged to the open position by valving lever 268 upon actuation of the valve actuating ram 270 which ram is connected to a source of compressed gas through an electrically actuated valve generally designated 272. The electrically actuated valve 272 is connected to the upper and lower ends of the ram 270 by conduits 274 in a conventional manner. It will be noted particularly in FIG. 8 that the lever mechanism 268 is also in contact with an arm 276 which in turn actuates a microswitch 278 provided in a control and indicator circuit for the mechanism.

Figure 9:
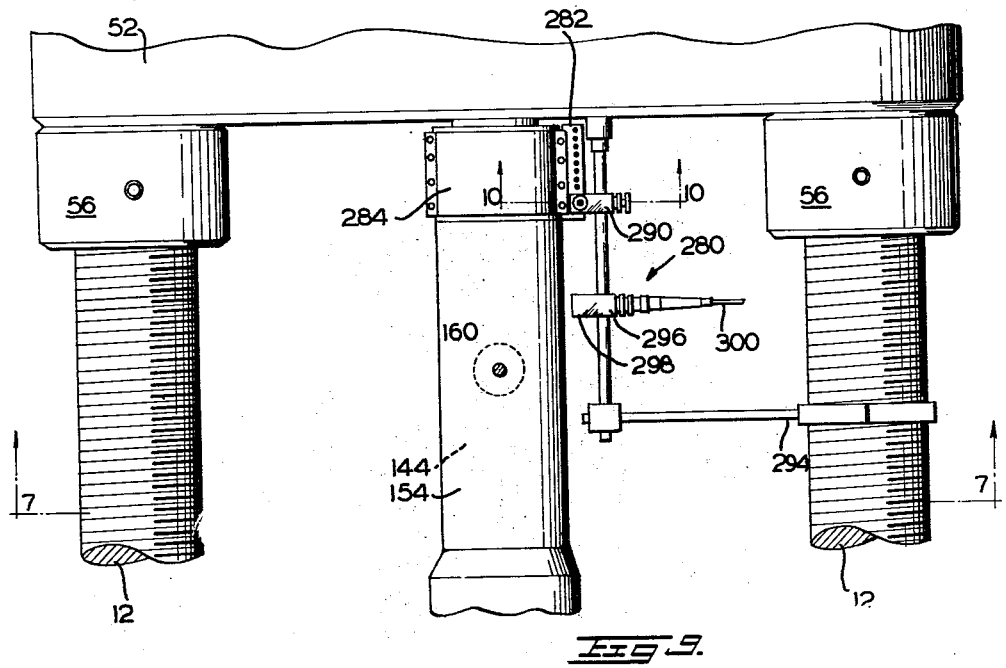
FIG. 9 is an enlarged fragmentary detailed view of the center portion of the machine illustrating a portion of the instrumentation therefor.
Figure 10:
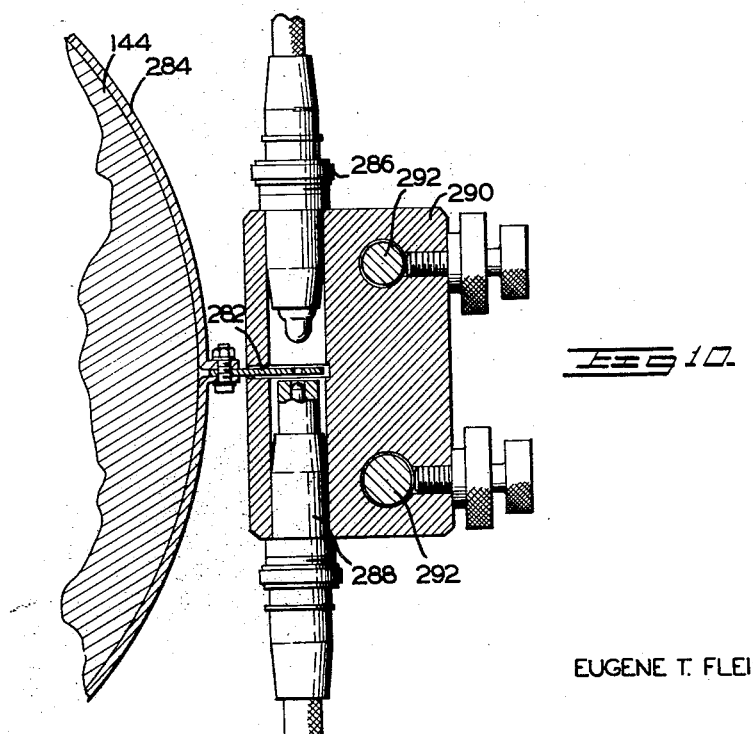
FIG. 10 is a section substantially on line 10—10 of FIG. 9.

Referring particularly to FIGS. 7, 9 and 10, a portion of the indicator and control means for the improved impact testing machine of the present invention is illustrated. In these drawings 280 generally designates a photoelectric displacement-time transducer, which provides a series of electronic pulses generated by a perforated plate 282 attached by band means 284 to the upper end of the ram 144. The perforated plate 282 is interposed between a light source 286 and a photoelectric cell 288. The light source and the photoelectric cell are mounted in a block 290 which is adjustably supported on a pair of standards 292 which in turn are supported by bracket means 294 secured to a main support column 12. Positioned below the plate 290 is a further electronic triggering means 296 which is arranged for triggering a beam of a cathode ray oscilloscope when it is desired to make a single frame photographic record of the oscilloscope trace. The triggering means 296 includes an electromagnetic transducer 298 which is energized by the approach of the perforated plate 282 and the electromagnetic transducer is connected to suitable photographic mechanism through electrical conductors 300.

*Operation*

In operation of the impact testing machine of the invention with the piston 86 in its most downward position and with the breech of the breech mechanism 30 in the "open" position and no cartridge case within the gun chamber 28, valve mechanism 132 is opened to a commercial supply of bottled nitrogen at a pressure of 2,000 p.s.i. Nitrogen is thus fed into chamber B, thence into chamber A as it flows through the opening 104 in the transverse partition member 62. The nitrogen is forced into the chambers A and B to a pressure of about 1,400 p.s.i. When this pressure is reached, the valving mechanism 132 is closed. Where the triggering mechanism operates on hydraulic fluid a small amount of hydraulic fluid is placed within the ram mechanism on top of the piston head before the cylinder chambers are pressurized. The amount of hydraulic fluid placed within the ram mechanism is sufficient so that when the piston is in its most upward position, the level of the hydraulic fluid is about as indicated at 310 in FIG. 5. This hydraulic fluid is placed within the cylinders through one of the conduits 244 or 258. This may be done by a valved passage or by opening one of the couplings for these conduits.

With the oil in the cylinder and with the chambers A and B filled with nitrogen at about 1,400 p.s.i., the piston 86 is then moved upwardly by, for example, pumping hydraulic fluid from the source 139 through conduit 136 and bore 134 in the lower flange. As the hydraulic fluid is forced below the piston 86 into chamber A, the piston is caused to move upwardly carrying with it the small pool of hydraulic fluid placed above the piston head and forcing the nitrogen in chamber A into chamber B. During the upward movement of the piston, the trigger valve mechanism 128 is in the "open" position whereby hydraulic fluid is permitted to flow from the top surface of the piston through the valve and return to the bottom of chamber B through conduit 258. When the piston 86 has reached its most upward position so that the head of the piston is seated against the lower surface of the partition member 62 and the top of the valve spool is seated against the valve seat member 116, the trigger valve 128 is closed and pressure fluid is directed to rams 158 and 166 whereby the ram locks 154 and 156 are moved into the ram lock position as illustrated in FIG. 2. Then the hydraulic pumping mechanism for directing the hydraulic fluid through bore 134 against the lower end of the piston 86 is reversed, draining the oil from the chamber A. After the hydraulic fluid has been removed from chamber A, valve 142 in conduit 140 at the lower end of the hydraulic ram mechanism is opened and a gas at a pressure of about 100 p.s.i. is placed in chamber A. The relatively low pressure in chamber A acting on the undersurface of the piston 86 and the balanced shape of the valve spool 102 create a balanced condition whereby the high pressure in chamber B, now at about 4,000 p.s.i., does not exert any positive accelerating force upon the piston. The balanced conditions exist since the piston area is closed off to the high pressure gas by the lower portion of the valve spool; and because the pressure acting on the lower portion of the valve spool is equalized by the pressure acting on the upper portion of the valve spool. Therefore, even without the ram locks 154 and 156 the piston 86 would not be accelerated downwardly.

When the piston is in its most upward position, a cartridge case 42, to be tested, is positioned within the cartridge case chamber 28, the breech mechanism closed and a relatively incompressible fluid such as water is directed into the resilient bladder 184 through metering mechanism 210. The level of the fluid placed in the bladder is about at line A, FIG. 4 of the drawings, while the upper end of the ram is at about line B. When the fluid is within the bladder, the testing mechanism is ready to be actuated and the ram locks 154 and 156 are moved away from the flange 150 of the ram 144. To actuate the mechanism, the actuator 272 is energized directing pressure fluid to the small ram 270 which in turn opens the trigger valve 128. With trigger valve 128 open, the hydraulic fluid in the reservoir or well 262 under about 4,000 pounds pressure, flows through the conduit 258, through the vave 128 into the conduit 244, down the bore 242, in the valve seat mechanism 116, into the bore 246, in the valve spool and the radial passages 248 in the piston head. The high pressure hydraulic fluid acting between the head of the valve spool and the valve spool seat and between the piston head and the lower surface of the partition member 62 drives the piston downwardly until the sealing surfaces break away and the chamber B pressure is applied over the entire top surfaces of the piston and its attached valve spool 102.

Since sealing rings 114, 254 are fed by high pressure hydraulic fluid through the bleed orifice 256 at the top of the piston valve spool and the openings 250 directing hydraulic fluid to the top of the piston head as the piston moves down there is no substantial unbalance of force tending to blow the sealing rings 114 and 254 from their ring grooves.

The high pressure nitrogen stored within chamber B drives the piston down at high velocity and the ram end 144 plungers into the cartridge case compressing first a small volume of air therein and then the water, to develop a pressure of as much as about 75,000 p.s.i. in a pressure-rise time of about .005 second in a 90 millimeter cartridge case. Since all of the force of the ram is not generally employed in the testing of the cartridges and in the event of cartridge rupture, the piston must be decelerated by the decelerating action of piston portion 100 entering the tapered bore 98 in the decelerating ring 96 against pressure of the low pressure gas in chamber A.

After the piston has come to rest, hydraulic fluid is again pumped from the source of hydraulic fluid through conduit 136 to the lower end of the piston 86, forcing the piston upward and recompressing the nitrogen to its actuating pressure of about 4,000 p.s.i. The sealing oil from the cup or well 262 is also forced upwardly, again providing a secondary seal of oil and triggering fluid. When the piston has reached the limit of its upward stroke and a new cartridge is placed in the cartridge chamber, the device is ready for another test.

From the foregoing description, it will be seen that the ram driving nitrogen gas is re-used and only such losses as may occur about the various seals is required to be replaced. Thus an operating rate of 240 or more tests per hour are possible where automatic cartridge loading and removing mechanisms are employed.

From the foregoing description, it will also be apparent that various modifications may be made in the form of the device and its operation without departing from the scope of the appended claims. For example, the oil triggering system described with reference to FIGS. 1 through 11 may be replaced by a gaseous triggering system wherein the compressed gas in chamber B is directly employed to initially move the piston 86 downward to open the port in the partition means 62 so that the entire force of the pressure fluid may act against the piston to drive it rapidly to the impact position. Such a form of the invention is illustrated in FIG. 12 wherein like parts are designated with identical reference numerals. Referring to FIG. 12, the conduit 260 in the partition member 62 is connected by conduit 258' to the automatic trigger valve 128. The outlet from the valve 128 is connected by conduit 350 to a bore 352 through the wall of the cylinder 60 below the partition 62. The bore 352 in the wall of the cylinder registers with the bores 248 in the piston head. In turn, the bores 248 register with the vertical bore 246 in the valve spool 102. The stem 240' of the valve seat member 116 is not bored as in the form illustrated in FIG. 3 and the upper end of the valve spool bore 246 terminates at the line of contact between the spool head and the valve seat. In this form of construction, the pressure of the compressed gas in chamber B flows through conduit 260 and conduit 258' to the valve 128. When the valve 128 is open, pressure fluid flows through conduit 350, bore 352 to bores 248 and bore 246 in the movable piston. This pressure fluid acting between the piston head and the lower surface of the partition member 62 and between the upper surface of the valve spool 102 and the surface of the valve spool seat, in valve spool seating means 116, initially urges the piston 86 downward. As soon as the piston 86 has moved a distance sufficient for the orifice 104 in the partition plate 62 to open, then the entire force of the compressed gas to act upon the exposed surface of the piston and its integral valve spool accelerating the piston in its downward movement. The conduit 350 is provided with a bleed valve 354 to remove the compressed gas from conduits 246 and 248, bore 352 and conduit 350 after the piston has been urged to its most upward position. By bleeding the pressure fluid from these conduits, there is no pressure fluid acting against the head of the piston and the upper surface of the piston valve spool 102 until the trigger valve 128 is opened. By shortening the length of conduit 350, there is less compressed gas which needs to be vented which in turn reduces the gas losses during the operation of this form of the invention.

I claim:

1. A pressure fluid ram device comprising a cylinder, heads at each end of said cylinder, a transverse partition having an opening therethrough concentric with the bore of the cylinder and dividing said cylinder into first and second chambers, a piston movable in the first chamber and having a piston rod extending therefrom through an opening in the cylinder head adjacent said first chamber, a valve spool carried by the piston and adapted to project through the opening in the partition, said valve spool having a flow control surface and a pressure fluid reaction surface thereon, valve seat means in the second chamber engaging and seating the pressure fluid reaction surface on said valve spool when the piston is in contact with the partition, the flow control surface presenting balance pressure fluid reaction surfaces to pressure fluid maintainable in said second chamber whereby there is substantially no unbalance of forces due to pressure fluid maintainable in said second chamber tending to urge the piston away from the partition, means for moving the piston toward said partition to seat the pressure fluid reaction surface in said valve seat means against elastic pressure fluid in said second chamber and means for moving the piston away from the partition to unseat said pressure fluid reaction surface from said valve seat means whereby the pressure fluid in said second chamber passes through the opening in the partition and moves said piston through the first chamber.

2. A pressure fluid ram device comprising a cylinder, heads at each end of said cylinder, a transverse partition having an opening therethrough concentric with the bore of the cylinder and dividing said cylinder into first and second chambers, a piston movable in the first chamber and having a piston rod extending therefrom through an opening in the cylinder head adjacent said first chamber, a valve spool carried by the piston and adapted to project through the opening in the partition, said valve spool having a flow control surface and a pressure fluid reaction surface thereon, valve seat means in the second chamber engaging and seating the pressure fluid reaction surface on said valve spool when the piston is in contact with the partition, the flow control surface presenting balanced pressure fluid reaction surfaces to pressure fluid maintainable in said second chamber whereby there is substantially no unbalance of forces due to pressure fluid maintainable in said second chamber tending to urge the piston away from the partition, means for moving the piston toward said partition to seat the pressure fluid reaction surface in said valve seat means against elastic pressure fluid in said second chamber, valved conduit means providing communication between the valve seat means and the elastic pressure fluid in the second chamber for moving the piston away from the partition to unseat said pressure fluid reaction surface from said valve seat means whereby the pressure fluid in said second chamber passes through the opening in the partition and moves said piston through the first chamber.

3. A pressure fluid ram device comprising a cylinder, heads at each end of said cylinder, a transverse partition having an opening therethrough concentric with the bore of the cylinder and dividing said cylinder into first and second chambers, a piston movable in the first chamber and having a piston rod extending therefrom through an opening in the cylinder head adjacent said first chamber, a valve spool carried by the piston and adapted to project through the opening in the partition, said valve spool having a flow control surface and a pressure fluid reaction surface thereon, valve seat means in the second chamber engaging and seating the pressure fluid reaction surface on said valve spool when the piston is in contact with the partition, the flow control surface presenting balanced pressure fluid reaction surfaces to pressure fluid maintainable in said second chamber whereby there is substantially no unbalance of forces due to pressure fluid maintainable in said second chamber tending to urge the piston away from the partition, hydraulic means for moving the piston toward said partition to seat the pressure fluid reaction surface in said valve seat means against elastic pressure fluid in said second chamber and means for moving the piston away from the partition to unseat said pressure fluid reaction surface from said valve seat means whereby the pressure fluid in said second chamber passes through the opening in the partition and moves said piston through the first chamber.

4. The invention defined in claim 3 wherein said hydraulic means for moving the piston toward said partition comprises a source of hydraulic fluid under pressure, means connecting said source of hydraulic fluid to said first chamber for moving said piston toward said second chamber and compressing the elastic pressure fluid thereinto.

5. A pressure fluid ram device comprising a cylinder, heads on each end of said cylinder, a transverse partition dividing said cylinder into first and second chambers, said transverse partition having an opening therethrough concentric with the bore of the cylinder, a piston movable in the first chamber and having a piston rod extending therefrom through an opening in the cylinder head adjacent said first chamber, a valve spool carried by the piston on the opposite side from said piston rod and adapted to project through the opening in the partition, said valve spool having a flow control surface and a pressure fluid reaction surface thereon, valve seat means in the second chamber engaging and seating the pressure fluid reaction surface on said valve spool when the piston is in contact with the partition, the flow control surface presenting balanced pressure fluid reaction surfaces to pressure fluid maintainable in said second chamber whereby there is substantially no unbalance of forces due to pressure fluid maintainable in said second chamber tending to urge the piston away from the partition, a source of hydraulic fluid and pump means, conduit means connecting the output of said pump means adjacent the cylinder head of said first chamber for moving the piston toward said partition to seat the pressure fluid reaction surface in said valve seat means against elastic pressure fluid in said second chamber and pressure fluid means for moving the piston away from the partition to unseat said pressure fluid reaction surface from said valve seat means whereby the pressure fluid in said second chamber passes through the opening in the partition and moves said piston through the first chamber.

6. A pressure fluid ram device comprising a cylinder, heads on each end of said cylinder, a transverse partition dividing said cylinder into first and second chambers, said transverse partition having an opening therethrough concentric with the bore of the cylinder, a piston movable in the first chamber and having a piston rod extending therefrom through an opening in the cylinder head adjacent said first chamber, a valve spool carried by the piston on the opposite side from said piston rod and adapted to project through the opening in the partition, means in the second chamber seating the extended end of the valve spool when the piston is in contact with the partition, said valve spool having end portions of substantially equal diameter and a reduced center portion, said end portion adjacent the piston adapted to snugly engage the walls of the opening in the partition, said other end portion of said valve spool adapted to be snugly received in the means in the second chamber for seating said valve spool, whereby there is substantially no unbalance of forces due to pressure fluid maintainable in said second chamber tending to urge the piston away from the partition, a source of hydraulic fluid and pump means, conduit means connecting the output of said pump means adjacent the cylinder head of said first chamber for moving the piston toward said partition to seat the valve spool in said valve seat against elastic pressure fluid in said second chamber and pressure fluid means for moving the piston away from the partition to unseat said valve spool from said valve seat whereby the pressure fluid in said second chamber passes through the opening in the partition and moves said piston through the first chamber.

7. An impact testing device comprising a cylinder, heads at each end of said cylinder, a transverse partition having an opening therethrough concentric with the bore of the cylinder and dividing the cylinder into first and second chambers, a piston movable in the first chamber and having a piston rod extending therefrom through an opening in the cylinder head adjacent said first chamber, a valve spool carried by the piston and adapted to snugly project through the opening in the partition, said valve spool having a flow control surface and a pressure fluid reaction surface thereon, valve seat means in the second chamber engaging and seating the pressure fluid reaction surface on said valve spool when the piston is in contact with the partition, the flow control surface presenting balanced pressure fluid reaction surfaces to pressure fluid maintainable in said second chamber whereby there is substantially no unbalance of forces due to pressure fluid maintainable in said second chamber tending to urge the piston away from the partition, pressure fluid means for moving the piston toward the partition to seat the pressure fluid reaction surface in said valve seat means against elastic pressure fluid in said second chamber, pressure fluid means for moving the piston away from the partition to unseat said pressure fluid reaction surface from said valve seat means whereby the pressure fluid in said second chamber passes through the opening in the partition and moves said piston through the first chamber, a ram carried by the extended end of said piston rod, a material holding structure positioned in axial alignment with said ram to receive the impact force thereof during the travel of said piston away from said partition.

8. The invention defined in claim 7 including releasable latch means cooperating with said ram for maintaining said piston in engagement with the partition against the elastic pressure fluid in said second chamber.

9. The invention defined in claim 7 including ram movement sensing means comprising a source of light, a light-sensitive device, and a perforated plate carried by said ram and positioned between said source of light and said light-sensitive device.

10. The invention defined in claim 7 including ram movement sensing means comprising a source of light, a light-sensitive device, and means carried by said ram and positioned between said source of light and said light-sensitive device to intermittently interrupt the passage of light to said light-sensitive device upon movement of said ram.

References Cited in the file of this patent

UNITED STATES PATENTS

| | | |
|---|---|---|
| 2,743,604 | Stein et al. | May 1, 1956 |
| 2,931,218 | Ottestad | Apr. 5, 1960 |
| 2,957,337 | Choate et al. | Oct. 25, 1960 |
| 2,979,938 | Ottestad | Apr. 18, 1961 |

OTHER REFERENCES

Publication: Hyge Shock Tester, Consolidated Elec. Corp., Rochester Div., bulletin 4-70, February 1957, pages 1-9. (Copy in 73-12.)